United States Patent [19]
Fukuwa

[11] Patent Number: 5,440,356
[45] Date of Patent: Aug. 8, 1995

[54] SPECTACLE FRAME INCLUDING SELF-ALIGNING TEMPLE END PIECE

[75] Inventor: Yasuo Fukuwa, Tokyo, Japan

[73] Assignee: Pentax Vision Co., Ltd., Tokyo, Japan

[21] Appl. No.: 257,511

[22] Filed: Jun. 9, 1994

[30] Foreign Application Priority Data

Jun. 11, 1993 [JP] Japan .................................. 5-166198

[51] Int. Cl.⁶ .............................................. G02C 5/14
[52] U.S. Cl. .................................. 351/123; 351/149
[58] Field of Search ............... 351/111, 115, 121, 123, 351/149, 153; 2/448, 450

[56] References Cited

U.S. PATENT DOCUMENTS

| | | | |
|---|---|---|---|
| D. 310,087 | 8/1990 | Weidmann et al. | D16/123 |
| 4,652,098 | 3/1987 | Anger | 351/123 |
| 4,655,564 | 4/1987 | Czech | 351/41 |
| 4,755,042 | 7/1988 | Anger | 351/123 |
| 4,787,728 | 11/1988 | Anger | 351/118 |
| 4,925,291 | 5/1990 | Anger et al. | 351/123 |
| 5,076,681 | 12/1991 | Lhospice | 351/123 |

FOREIGN PATENT DOCUMENTS 4121691  1/1992  Germany ............................. 351/111

*Primary Examiner*—William L. Sikes
*Assistant Examiner*—Huy Mai
*Attorney, Agent, or Firm*—Sandler, Greenblum & Bernstein

[57] ABSTRACT

A spectacle frame is provided with a pair of temples extending from the lens-holding front frame. The temples have swingable temple end pieces that swing relative to the rear portion of the temple. The swingable end pieces ensure that the spectacle frames do not slip down the nose, without increasing pressure on the nose or on the back of the ears.

16 Claims, 6 Drawing Sheets

NEUTRAL

+7 DEGREES

−6 DEGREES

NEUTRAL　　　　+7 DEGREES　　　　−6 DEGREES

SPECTACLE FRAME INCLUDING SELF-ALIGNING TEMPLE END PIECE

BACKGROUND OF THE INVENTION

Generally, spectacle frames have a front frame that holds lenses, a nose pad, and a pair of temples attached to the front frame. When the spectacles are worn, a temple end piece, at the rear end of each temple, bends down behind the user's ear.

However, the temple and the temple end piece are usually integrally constructed, where the temple end piece is usually bent downwardly at some angle, also known as a golf temple. The temple end piece is apt to slip upwardly when the user's head bends down or when the user is active, causing the spectacles will slip down the user's nose.

There is known in the art a temple end piece including an elastic or flexible member extending between points on the temple end piece, constituting a double-membered structure, such that the flexible member contacts the rear region of the ear between the auricle and skull and the temple end piece supports the flexible member. The flexible member may take the shape of the rear region of the ear by elasticity, and prevents the spectacles from slipping by exerting a constant rearward force to maintain the spectacles in constant position. The flexible member may be non-elastic but formed of a soft plastic, and may be formed to match the shape of the rear region of the ear, preventing the spectacles from slipping by restraining the movement of the end piece as the spectacles tend to slip up (U.S. Pat. No. 4,925,291).

There is also known a spectacle frame in which the temple end piece is itself an elastic member, and wraps around the rear region of the ear to provide a constant rearward force.

The prior art using a flexible or elastic member suffers the disadvantages that the flexible or elastic member may not have satisfactory strength or durability, and that a constant rearward force on the frame may be uncomfortable both on the bridge of the user's nose and on the rear of the user's ears. Furthermore, when a flexible or non-flexible member begins to counteract the slipping of the spectacles, the contact between the member and the rear portion of the ear may only be distributed over a small area, giving a feeling of pressure on the rear portion of the ears.

SUMMARY OF THE INVENTION

It is therefore an object of the present invention to provide an apparatus that satisfies the need for a spectacle frame that is strong and durable, that has an improved appearance, that ensures that any force on the rear portion of the ears is evenly distributed, and that has anti-slip properties without significantly increasing the force applied to either the bridge of the nose or to the rear portion of the ears.

The improved spectacle frame includes a front frame that holds the spectacles, a pair of temples extending rearwards from the front frame, and a pair of temple end pieces swingably connected to the rear portion of the temples. The swinging range of each temple end piece is regulated at the connection between the temple end piece and the temple, and the temple end pieces are swingably self-adjusting to the rear portion of the ear.

DESCRIPTION OF THE ACCOMPANYING DRAWINGS

Figure 4A:
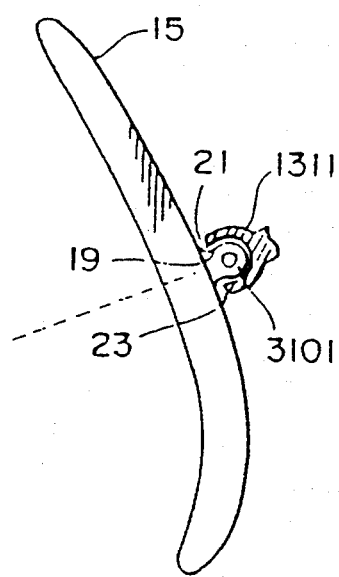
Figure 4B:
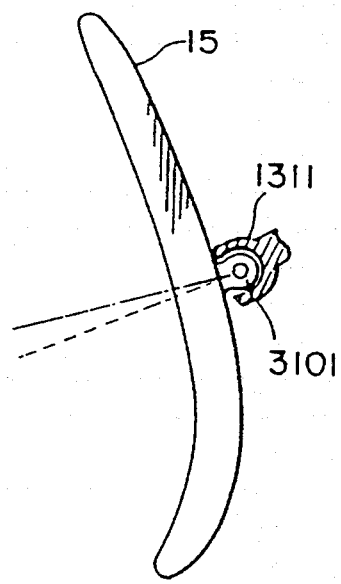
Figure 4C:
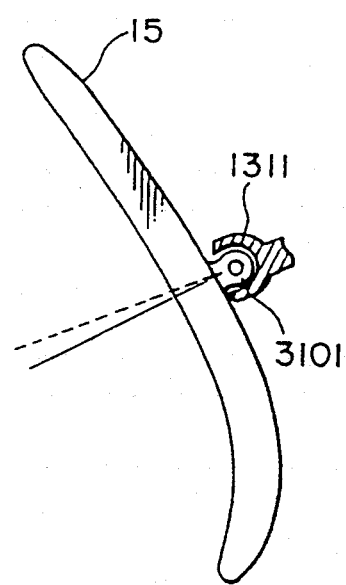
Figure 5A:
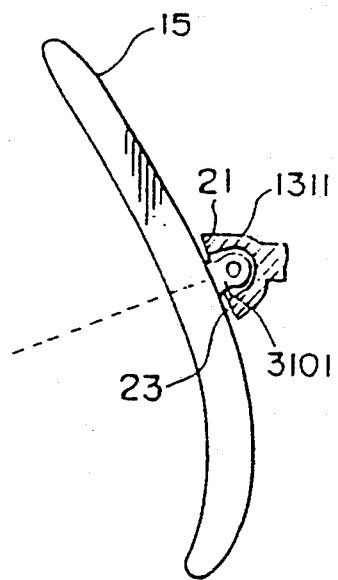
Figure 5B:
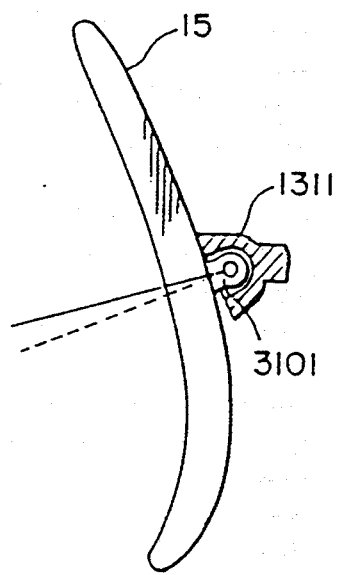
Figure 5C:
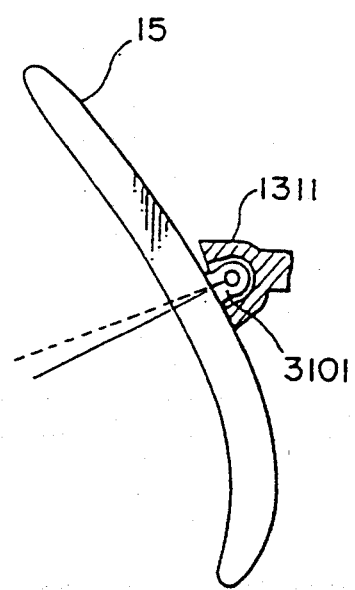
Figure 6:
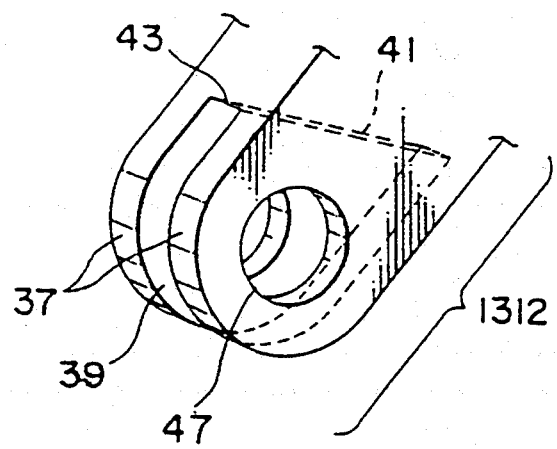
Figure 7:
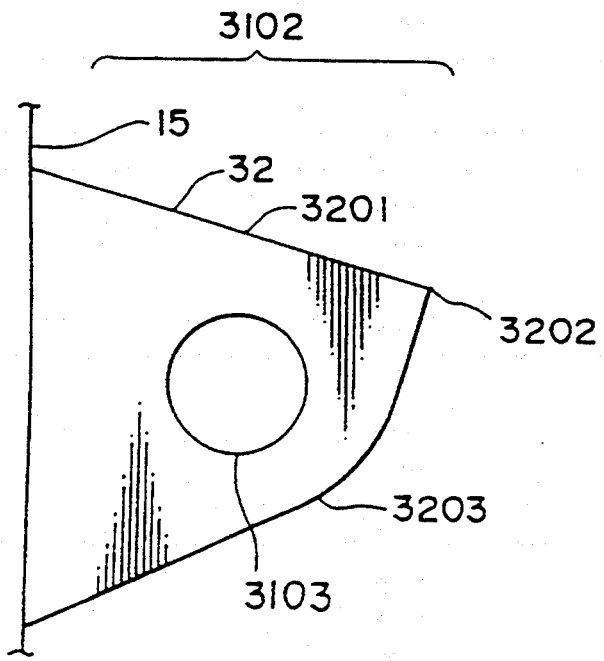
Figure 8A:
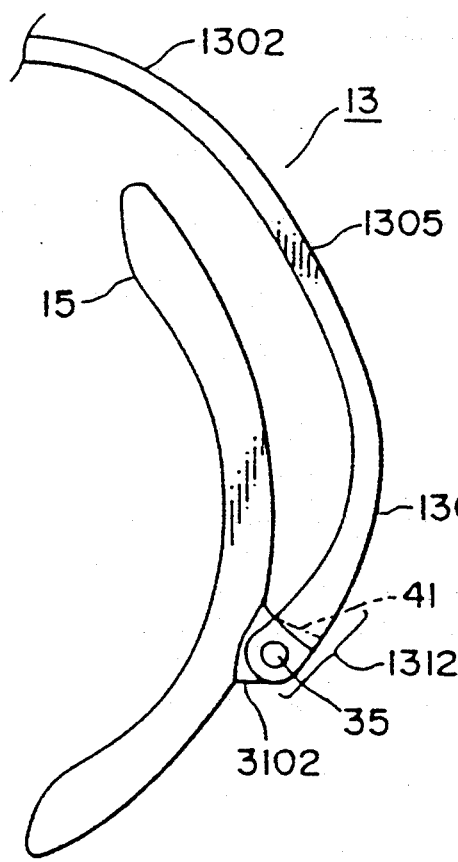
Figure 8B:
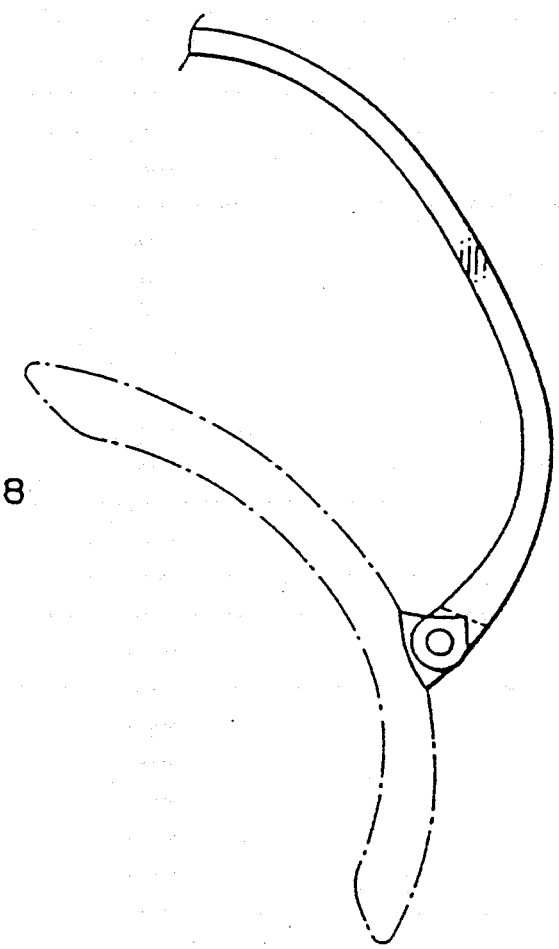

FIGS. 4(a)–4(c) show the range of swinging movement of the first embodiment, where the restraining contact at the linkage segment is an edge-to-surface contact;

FIGS. 5(a)–5(c) show the range of swinging movement of the first embodiment, where the restraining contact at the linkage segment is an surface-to-surface contact;

FIG. 6 is a detailed perspective view of the linkage segment of the second embodiment;

FIG. 7 is a detailed side view of the flat connection member of the second embodiment; and FIGS. 8(a) and 8(b) show the range of swinging movement of the second embodiment.

DESCRIPTION OF THE EMBODIMENTS

With reference to the drawings, two embodiments of the present invention are described.

Figure 1:
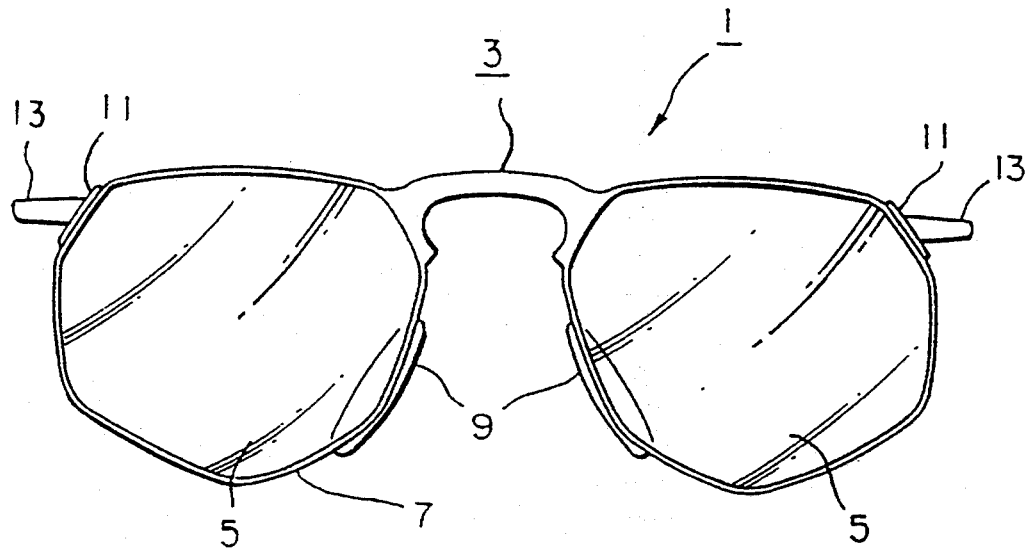
FIG. 1 is a front view of a spectacle frame incorporating the common elements of the embodiments of the present invention.
Figure 2:
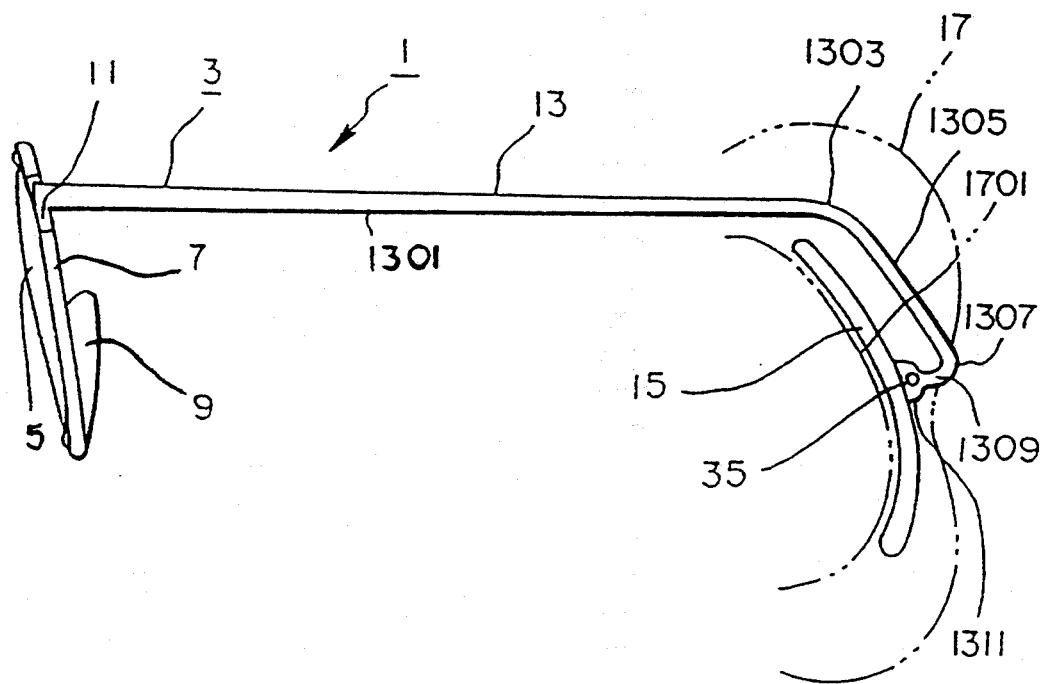
FIG. 2 is a side view thereof.

As shown in FIG. 1 and FIG. 2, in a pair of spectacles 1, the spectacle frame 3 includes a front frame 7 that holds lenses 5, a nose pad 9 attached to the front frame 7, and a pair of left and right temples 13. The temples 13 are connected via hinges 11 to the left and right sides of the front frame 7 and extend away from the spectacle frame 3 and towards the ears 17. A temple end piece 15 is swingably connected to the rear end of each temple 13.

Figure 3:
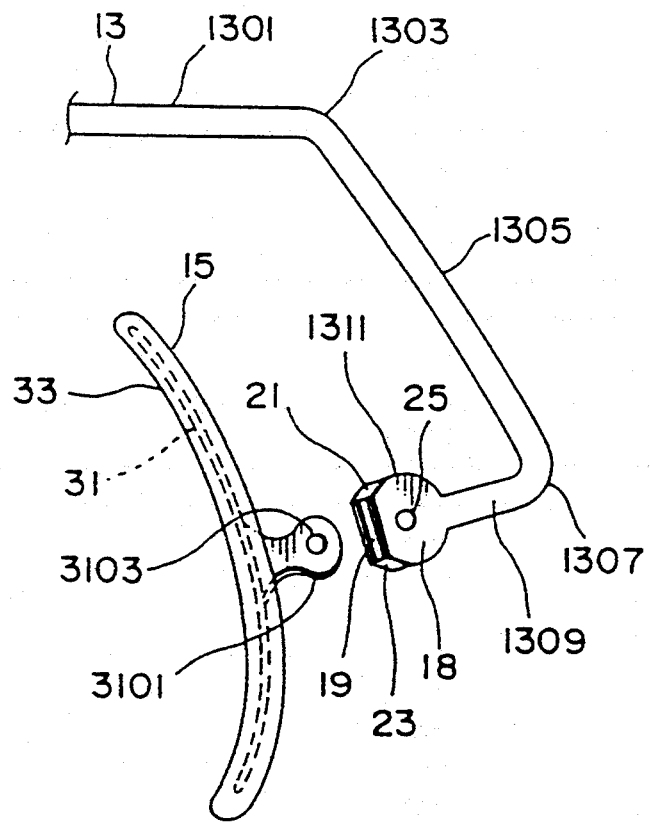
FIG. 3 is a partially exploded side view of the first embodiment, showing the relationship between the linking elements of the first embodiment.

The first embodiment is shown in FIGS. 3 to 5. The temple 13 includes a substantially linear segment 1301 extending rearward from the frame hinge 11, an inclined segment 1305, a lower end segment 1309, and a linkage segment 1311. The inclined segment 1305 extends diagonally downwards from linear segment 1301 via an obtuse angle bend 1303, passing behind the rear portion of a user's ear 1701. Lower end segment 1309 extends from the lower end of the inclined segment 1305 towards the front frame 7, via an acute angle bend 1307. The linkage segment 1311 is provided at the distal end of the lower end segment 1309. A variation on the structure of the temple and the temple end piece may also be used in the first embodiment, such as a variation in which a curved rear portion of the temple 13 substantially follows a curve parallel to the temple end piece 15.

FIG. 3 shows the rear portion of the temple 13 and of the temple end piece 15. As shown, the linkage segment 1311 is formed to be flat in the plane of the temple end piece 15, with parallel left and right sides 18, 18 and a slot 19. The slot 19 is open at the side of the linkage segment 1311 facing the front frame 7. Further, the slot 19 is bounded at its upper side by upper inclined restraining surface 21, and is bounded at its lower side by lower inclined restraining surface 23. A pivot hole 25, aligned to accept a pivot member 35, is provided to each of the left and right sides 18, 18.

The temple end piece 15 is an independent deformable member, formed separately from the temple 13 and swingably linked to the temple 13 via the linkage segment 1311. The temple end piece 15 is therefore swingably self-adjusting to fit the profile of the rear portion 1701 of a user's ear 17.

The temple end piece 15 is composed of a soft metal core member 31 and a surrounding flexible covering 33. The surrounding flexible covering 33 may be resin or silicon rubber or another flexible material.

The temple end piece 15 is formed in a curved shape. The curved shape is determined by a combination of circular arcs, each having an appointed length and center of curvature. The curved shape is set such that the temple end piece 15 may match both the upper part and the lower curved part of the rear portion 1701 of a user's ear 17, thereby closely fitting the rear portion 1701 of a user's ear 17.

A supporting flat connection member 3101 protrudes from the portion of the core metal member 31, positioned slightly below the middle along the length of the core metal member 31. A through hole 3103 that accepts the pivot member 35, perpendicular to the plane of the temple end piece 15, is formed in the connection member 3101.

The temple end piece 15 is linked to the temple 13 by inserting the connection member 3101 into the slot 19, and then inserting the pivot member 35, such as a screw or pin, through the pivot hole 25 and the through hole 3103, thereby swingably linking the connection member 3101 of the temple end piece 15 with the linkage segment 1311 of the temple 13. The pivot member 35 becomes the fulcrum upon which the temple end piece 15 swings.

In the linked state as described above, a neutral position is shown in FIGS. 4(a) and 5(a). The upward swinging range of the temple end piece 15 (about 7° in the preferred embodiment) is restricted by the upper inclined restraining surface 21 of the linkage segment 1311, when the upper portion of the temple end piece 15 contacts the upper inclined restraining surface 21. The angle of the upper inclined restraining surface 21 may be chosen such that the contact with the temple end piece 15 occurs on the edge of the upper inclined restraining surface 21, as shown in FIG. 4(b), or such that the contact with the temple end piece 15 occurs on the flat surface of the upper inclined restraining surface 21 as shown in FIG. 5(b). The downward swinging range of the temple end piece 15 (about 6° in the preferred embodiment) is restricted by the lower inclined restraining surface 23 of the linkage segment 1311, when the lower portion of the temple end piece 15 contacts the lower inclined restraining surface 23. The angle of the lower inclined restraining surface 23 may be chosen such that the contact with the temple end piece 15 occurs on the edge of the lower inclined restraining surface 23 as shown in FIG. 4(c), or such that the contact with the temple end piece 15 occurs on the flat surface of the lower inclined restraining surface 23 as shown in FIG. 5(c).

The temple end piece 15 is therefore free to swing within a certain range, and a user can wear the spectacles 1 of the present invention without hindrance.

FIG. 8(a) and 8(b) show an application of a second embodiment. A side view of the rear end portion of the temple 13 and of the temple end piece 15 is shown. In the second embodiment, the temple 13 includes a substantially linear segment 1301 extending rearward from the frame hinge 11, an upper curved segment 1302, an inclined segment 1305, a lower curved segment 1308, and an open linkage hinge 1312. The inclined segment 1305 extends diagonally downwards from linear segment 1301 via an upper curved segment 1302, passing behind the rear portion of a user's ear 1701. Lower curved segment 1308 extends from the lower end of the inclined segment 1305 towards the front frame 7. The open linkage hinge 1312 is provided at the distal end of the lower curved segment 1308.

As shown in FIG. 6, the open linkage hinge 1312 is formed to be flat in the plane of the temple end piece 15, with parallel left and right sides 37, 37 and an open slot 39. The open slot 39 is open at the side of the open linkage hinge 1312 substantially facing the front frame 7. Further, the slot has an inner restraining surface 41. A pivot hole 47 aligned to accept a pivot member 35 is provided to each of the left and right sides 37, 37.

The temple end piece 15 is an independent deformable member, formed separately from the temple 13 and swingably linked to the temple 13 via the open linkage hinge 1312. The temple end piece 15 is therefore swingably self-adjusting to fit the profile of the rear portion 1701 of a user's ear 17.

In the second embodiment, the temple end piece 15 is composed of a soft metal core member 31 and a surrounding flexible covering 33. The surrounding flexible covering 33 may be resin or silicon rubber or another flexible material.

The temple end piece 15 is formed in a curved shape. The curved shape is determined by a combination of circular arcs, each having an appointed length and center of curvature. The curved shape is set such that the temple end piece 15 may match both the upper inclined portion and the lower curved part of the rear portion of a user's ear 1701, thereby closely fitting the rear portion of a user's ear 1701.

A flat connection member 3102, shown in detail in FIG. 7, protrudes from a portion of the core metal member 31, positioned along the length slightly below the middle of the core metal member 31. The flat connection member 3102 is formed to be flat on opposite surfaces in the plane of the temple end piece 15, and the contour of the side surface 32 of the flat connection member 3102 is of a predetermined shape. The side surface 32 of the flat connection member 3102 is formed with a contact surface 3201, a corner contact edge 3202, and a rounded surface 3203. A through hole 3103 that accepts the pivot member 35, perpendicular to the plane of the temple end piece 15, is formed in the connection member 3102.

The temple end piece 15 is linked to the temple 13 by inserting the connection member 3102 into the open slot 39, and then inserting the pivot member 35, such as a screw or pin, through the pivot hole 47 and the through hole 3103, thereby swingably linking the connection member 3102 of the temple end piece 15 with the open linkage hinge 1312 of the temple 13. The pivot member 35 becomes the fulcrum upon which the temple end piece 15 swings.

In the linked state as described above, the upward swinging range of the temple end piece 15 (about 7° in the preferred embodiment) is restricted by the upper edge 43 of the inner restraining surface 41 of the open slot 39, when the upper contact surface 3201 of the side surface 32 of the flat connection member 3102 contacts the upper edge 43 of the inner restraining surface 41, as shown in FIG. 8(a). The downward swinging range of the temple end piece 15 (about 6° in the preferred embodiment) is restricted by the inner restraining surface 41 of the open linkage hinge 1312, when the corner contact edge 3202 of the side surface 32 abuts the middle portion of the inner restraining surface 41, as shown in FIG. 8(*b*). The rounded surface 3203 is shaped so that it does not protrude beyond the open linkage hinge 1312 when linked.

The temple end piece 15 is therefore free to swing within a certain range, and a user can wear the spectacles 1 of the present invention without hindrance.

When the spectacles 1 of the embodiments are worn, if the front frame 7 is about to slip down, the rear portion of the temple 13 will be urged in an upward direction. However, as the rear portion of the temple is urged upwards, the linked temple end piece 15 is similarly urged, and the entire spectacle 1 tends to move in a counter-clockwise direction. Relative movement between the upper portion of the temple end piece 15 and the rear portion 1701 of the ear 17 is prevented by the resulting increase in contact force at the upper part of the rear portion 1701 of the ear 17. The rear portion of the temple 13 is therefore prevented from slipping up, and the spectacles 1 do not slip down.

The temple end piece therefore accomplishes the object of preventing slip-down without a double-membered structure or the elastic members of a conventional anti-slip spectacle frame. The structure of the present invention is simple and sturdy.

It is considered that various structures are capable of swingably linking the temple end piece 15 with the rear end of the temple 13. For example, when a pivot member 35 is used, it is optional that a spring or other resilient member, placed between the temple end piece 15 and some portion of the rear end of the temple 13a, may be used to return the temple end piece 15 to a neutral position. Further, the temple end piece 15 may be swingably linked by a flexible member, instead of a pivot pin, to the rear portion of the temple 13. The flexible member may be made of rubber or another flexible material. A link by flexible member would not require a pivot member 35 such as a pin or screw. Therefore, a swingable linkage structure is not limited to the examples of the embodiments.

The present disclosure relates to a subject matter contained in Japanese Patent Application No. HEI 5-166198, filed on Jun. 11, 1993, which is expressly incorporated herein in its entirety.

What is claimed is:

1. A spectacle frame which comprises:
   a front frame in which a pair of lenses are mounted and having a temple hinge on each of left and right sides of the front frame;
   a temple extending rearwards from each said temple hinge;
   a temple end piece provided at each of said temples, swingably attached to a rear portion of each of said temples; and
   means for mounting each of said temple end pieces to a temple for pivotal motion restricted within a plane substantially parallel to a side of a user's head, whereby pivotal motion of said temple end piece provides a self alignment of said temple end piece with respect to a rear portion of an ear of the user.

2. A spectacle frame according to claim 1, said mounting means comprising:
   a connecting member, provided to the temple end piece, for connecting to the temple, and having a through hole therein;
   a linkage segment, provided to the temple, for linking to the connecting member, and having a pivot hole therein; and
   a pivot member, passing through the pivot hole and the through hole, for swingably linking the connecting member of the temple end piece and the linkage segment of the temple.

3. A spectacle frame according to claim 1, further comprising:
   at least one restraining portion, provided to each temple in the region where the temple end piece is connected to the temple, for restraining a swinging range of the temple end piece.

4. A spectacle frame according to claim 1, wherein the temple end piece is connected to the temple at an intermediate section on the temple end piece.

5. A spectacle frame according to claim 1, wherein the temple end piece and the rear portion of the temple follow substantially parallel curves.

6. The spectacle frame according to claim 1, said mounting means further comprising means for preventing the spectacle frame from slipping downwardly on the user's head.

7. The spectacle frame according to claim 1, said means for mounting further comprising means for restricting pivotal movement of said temple end piece within a predetermined range within the plane substantially parallel to a side of a user's head, said predetermined range defined by mutually abutting surfaces of said temple and said temple end piece.

8. The spectacle frame according to claim 1, said mounting means preventing relative movement between an upper portion of said temple, end piece and a rear portion of an ear of the user by increasing a contact force at an upper rear portion of the user's ear, thereby a rear portion of said temple is prevented from slipping up and the spectacle frame is prevented from slipping down.

9. A spectacle frame which comprises:
   a front frame in which a pair of lenses are mounted and having a temple hinge on each of left and right sides of said front frame;
   a temple, extending rearwards from each said temple hinge;
   a temple end piece mounted to each said temple;
   a connecting member, mounted to each said temple end piece, for connecting to each said temple, each connecting member having a through hole therein;
   a linkage segment, mounted to each said temple, for linking to the connecting member, and having a pivot hole therein;
   a pivot member, passing through the pivot hole of the linkage segment and passing through the through hole of the connecting member, for swingably linking the connecting member and the linkage segment; and
   said connecting member, said linkage segment, and said pivot member comprising means for mounting each said temple end piece to a respective said temple for pivotal motion restricted within a plane substantially parallel to a side of a user's head, whereby pivotal motion of said temple end piece provides a self-alignment of said temple end piece with respect to a rear portion of an ear of the user.

10. A spectacle frame according to claim 9, further comprising:
    at least one restraining portion, provided to the temple in a region where the temple end piece is connected to the temple, for restraining a swinging range of the temple end piece.

11. A spectacle frame according to claim 10, wherein at least one restraining portion is an internal surface of the linkage segment.

12. A spectacle frame according to claim 9, wherein the temple end piece is connected to the temple at an intermediate section on the temple end piece.

13. A spectacle frame according to claim 9, wherein the temple end piece and a rear portion of the temple follow substantially parallel curves.

14. The spectacle frame according to claim 9, said mounting means comprising means for preventing the spectacle frame from slipping downwardly on the user's head.

15. The spectacle frame according to claim 9, said mounting means mounting said temple end piece for pivotal motion within a predetermined range within the plane substantially parallel to a side of a user's head, said predetermined range defined by mutually abutting surfaces of said connecting member and said linkage segment.

16. The spectacle frame according to claim 9, said mounting means preventing relative movement between an upper portion of said temple end piece and a rear portion of an ear of the user by increasing a contact force at an upper rear portion of the user's ear, thereby preventing a rear portion of said temple from slipping up and the spectacle frame from slipping down.

* * * * *

UNITED STATES PATENT AND TRADEMARK OFFICE
CERTIFICATE OF CORRECTION

PATENT NO. : 5,440,356
DATED : August 8, 1995
INVENTOR(S) : Yasuo FUKUWA

It is certified that error appears in the above-indentified patent and that said Letters Patent is hereby corrected as shown below:

On the title page, item [56], "References Cited", "U.S. PATENT DOCUMENTS", insert
---4,863,257   9/1989   Morgan .......351/123---.

On the title page, item [56], "References Cited", "U.S. PATENT DOCUMENTS", insert
---4,389,102   6/1983   Piampiano .......351/123---.

On the title page, item [56], "References Cited", "FOREIGN PATENT DOCUMENTS", insert   ---4121691   1/1992   Germany---.

On the title page, item [56], "References Cited", "FOREIGN PATENT DOCUMENTS", insert   ---9110984   2/1992   Germany---.

On the title page, item [56], "References Cited", "FOREIGN PATENT DOCUMENTS", insert   ---9205717   8/1992   Germany---.

On the title page, item [56], "References Cited", "FOREIGN PATENT DOCUMENTS", insert   ---662038   7/1938   Germany---.

On the title page, item [56], "References Cited", "FOREIGN PATENT DOCUMENTS", insert   ---0202556   11/1986   E.P.O.---.

At column 1, line 33, change "up" to ---upwardly---.
At column 3, line 53, change "23" to ---23,---.
At column 4, line 13, change "47" to ---47,---.
At column 4, line 13, change "35" to ---35,---.

UNITED STATES PATENT AND TRADEMARK OFFICE
CERTIFICATE OF CORRECTION

PATENT NO. : 5,440,356
DATED : August 8, 1995
INVENTOR(S) : Yasuo FUKUWA

It is certified that error appears in the above-indentified patent and that said Letters Patent is hereby corrected as shown below:

At column 6, line 33 (claim 8, line 3), change "temple," to ---temple---.

Signed and Sealed this

First Day of October, 1996

Attest:

BRUCE LEHMAN

Attesting Officer

Commissioner of Patents and Trademarks